US012670163B2

(12) United States Patent
Ju et al.

(10) Patent No.: US 12,670,163 B2
(45) Date of Patent: Jun. 30, 2026

(54) DATA PROCESSING METHOD, ELECTRONIC DEVICE AND COMPUTER-READABLE MEDIUM

(71) Applicant: Beijing Volcano Engine Technology Co., Ltd., Beijing (CN)

(72) Inventors: Kejian Ju, Beijing (CN); Leilei Hu, Beijing (CN); Yuanpu Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/958,192

(22) Filed: Nov. 25, 2024

(65) Prior Publication Data

US 2025/0231943 A1 Jul. 17, 2025

(30) Foreign Application Priority Data

Jan. 16, 2024 (CN) .......................... 202410064671.8

(51) Int. Cl.
*G06F 16/00* (2019.01)
*G06F 8/51* (2018.01)
(Continued)

(52) U.S. Cl.
CPC ............ *G06F 16/2455* (2019.01); *G06F 8/51* (2013.01); *G06F 16/2452* (2019.01)

(58) Field of Classification Search
CPC ..... G06F 16/2455; G06F 8/51; G06F 16/2452
See application file for complete search history.

(56) References Cited

U.S. PATENT DOCUMENTS

| | | | | |
|---|---|---|---|---|
| 12,314,690 B2 * | 5/2025 | Ye | ............................. | G06F 8/34 |
| 2017/0053021 A1 | 2/2017 | Hewitt et al. | | |
| 2023/0040412 A1 * | 2/2023 | Ramsl | ....................... | G06F 8/73 |

FOREIGN PATENT DOCUMENTS

| | | |
|---|---|---|
| CN | 106372114 A | 2/2017 |
| CN | 108763573 A | 11/2018 |

(Continued)

OTHER PUBLICATIONS

China National Intellectual Property Administration, Office Action and Search Report Issued in Application No. 202410064671.8, Apr. 30, 2026, 18 pages.

(Continued)

*Primary Examiner* — Paul Kim
(74) *Attorney, Agent, or Firm* — Alleman Hall LLP

(57) ABSTRACT

Embodiments of the present disclosure disclose a data processing method, an electronic device, and a computer-readable medium. And the data processing method includes: receiving a data query request for a first data processing engine; determining, in a front-end node, a target data processing engine based on the data query request, where computer programming languages used by the first data processing engine and a second data processing engine are different; and when the target data processing engine is the second data processing engine, performing data query on data stored in a target database by using a preset software development kit and calling a language conversion interface based on an offline query request in the second data processing engine, where the language conversion interface is configured to receive a query instruction in a second language and call a query instruction in a first language.

20 Claims, 4 Drawing Sheets

100

101
Receive a data query request for a first data processing engine

102
Determine, in the front-end node, a target data processing engine based on the data query request 103
When the target data processing engine is a second data processing engine, perform data query on data to be queried in a target database by using a preset software development kit and calling a language conversion interface based on an offline query request in the second data processing engine

(51) Int. Cl.
    *G06F 16/2452*     (2019.01)
    *G06F 16/2455*     (2019.01)

(56)        References Cited

FOREIGN PATENT DOCUMENTS

| | | | |
|---|---|---|---|
| CN | 111966727 | A | 11/2020 |
| CN | 113157191 | A | 7/2021 |
| CN | 115129744 | A | 9/2022 |
| CN | 117271573 | A | 12/2023 |
| WO | 2023082681 | A1 | 5/2023 |

OTHER PUBLICATIONS

Yang, L. et al., "Cross-language calling c++ Practice under Linux," Meituan Technology Team, Available Online at https://tech.meituan.com/2022/04/21/cross-language-call.html, Apr. 21, 2022, 45 pages.

* cited by examiner

100

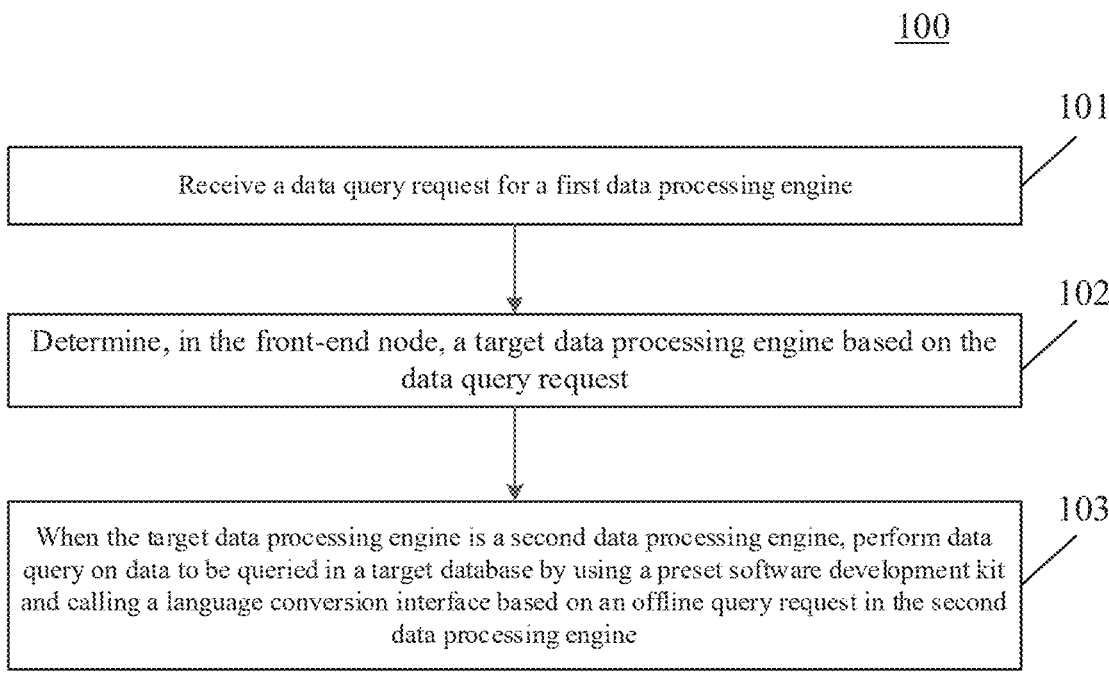

101

Receive a data query request for a first data processing engine

102

Determine, in the front-end node, a target data processing engine based on the data query request

103

When the target data processing engine is a second data processing engine, perform data query on data to be queried in a target database by using a preset software development kit and calling a language conversion interface based on an offline query request in the second data processing engine

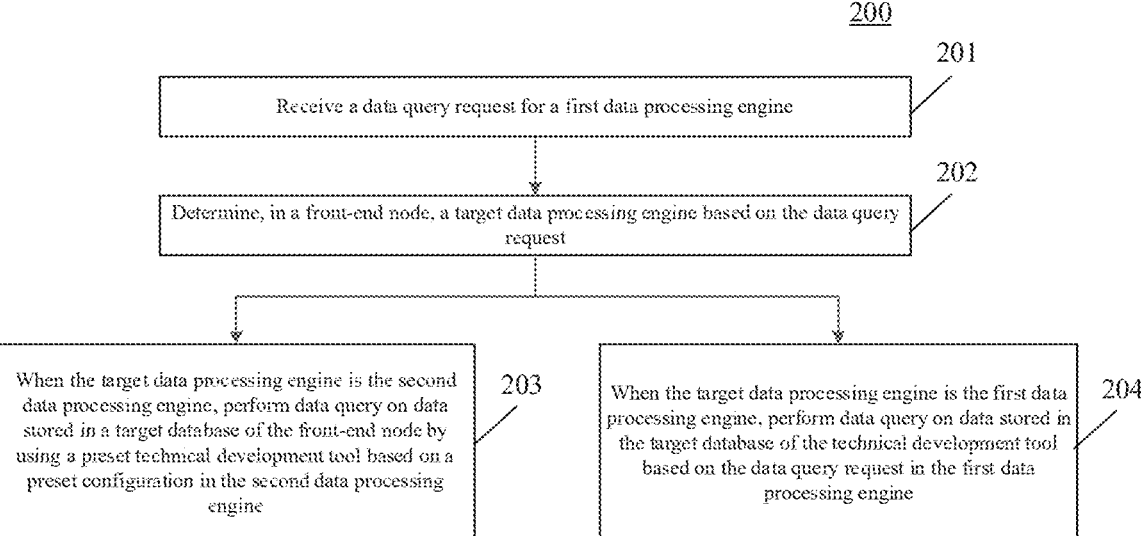

201

Receive a data query request for a first data processing engine

202

Determine, in a front-end node, a target data processing engine based on the data query request

203

When the target data processing engine is the second data processing engine, perform data query on data stored in a target database of the front-end node by using a preset technical development tool based on a preset configuration in the second data processing engine

204

When the target data processing engine is the first data processing engine, perform data query on data stored in the target database of the technical development tool based on the data query request in the first data processing engine

Fig. 2

DATA PROCESSING METHOD, ELECTRONIC DEVICE AND COMPUTER-READABLE MEDIUM

CROSS-REFERENCE TO RELATED APPLICATION

The present application claims the priority and benefits of Chinese Patent Application No. 202410064671.8, filed on Jan. 16, 2024, which is incorporated herein by reference in its entirety as part of the present application.

TECHNICAL FIELD

Embodiments of the present disclosure relate to a data processing method, an electronic device, and a computer-readable medium.

BACKGROUND

An OLAP (On-line Analytical Processing) database is mainly oriented to scene analysis of a real-time data warehouse, and a Spark engine is mainly oriented to processing and analysis of offline batch data. Because the OLAP is based on a memory-based MPP (Massively Parallel Processing) architecture, performance is higher than that of the Spark engine. However, when processing a large amount of data, the OLAP may face a stability problem.

With integration of the two systems, namely, the OLAP database and the Spark engine, an operation and maintenance cost is relatively high. In addition, a big data system is mainly in a Java language, and an OLAP system is mostly based on a C++ language. When capabilities of the two systems are to be provided at the same time, that is, capabilities of both real-time processing and offline processing are to be provided, how to solve a compatibility problem between the two languages needs to be considered.

SUMMARY

This section is provided to introduce concepts in a simplified form that are further described in the following detailed embodiments. This section is not intended to identify key features or essential features of the claimed technical solutions, nor is it intended to be used to limit the scope of the claimed technical solutions.

An embodiment of the present disclosure provides a data processing method, including: receiving a data query request for a first data processing engine, where the first data processing engine includes a front-end node and a back-end node, and the front-end node receives the data query request; determining, in the front-end node, a target data processing engine based on the data query request, where the target data processing engine is the first data processing engine or a second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and performing, when the target data processing engine is the second data processing engine, data query on data stored in a target database by using a preset software development kit and calling a language conversion interface based on an offline query request in the second data processing engine, where the software development kit is configured to query data, the language conversion interface is configured to receive a query instruction in the second language and call a query instruction in the first language, and the offline query request is generated based on the data query request.

An embodiment of the present disclosure provides a data processing apparatus, including: a receiving unit, configured to receive a data query request for a first data processing engine, where the first data processing engine includes a front-end node and a back-end node, and the front-end node receives the data query request; a determining unit, configured to determine, in the front-end node, a target data processing engine based on the data query request, where the target data processing engine is the first data processing engine or a second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and a calling unit, configured to perform, when the target data processing engine is the second data processing engine, data query on data stored in a target database by using a preset software development kit and calling a language conversion interface based on an offline query request in the second data processing engine, where the software development kit is configured to query data, the language conversion interface is configured to receive a query instruction in the second language and call a query instruction in the first language, and the offline query request is generated based on the data query request.

An embodiment of the present disclosure provides an electronic device, including: one or more processors; and a memory configured to store one or more programs, where the one or more programs, when executed by the one or more processors, cause the one or more processors to implement the data processing method as described above.

An embodiment of the present disclosure provides a computer-readable medium having a computer program stored thereon, where the data processing method as described above is implemented when the program is executed by a processor.

BRIEF DESCRIPTION OF DRAWINGS

The above and other features, advantages, and aspects of embodiments of the present disclosure become more apparent with reference to the following specific embodiments and in conjunction with the accompanying drawings. Throughout the drawings, the same or similar reference numerals denote the same or similar elements. It should be understood that the drawings are schematic and that parts and elements are not necessarily drawn to scale.

FIG. 1 is a flowchart of an embodiment of a data processing method according to the present disclosure;

FIG. 2 is a flowchart of another embodiment of a data processing method according to the present disclosure;

DETAILED DESCRIPTION

Figure 3:
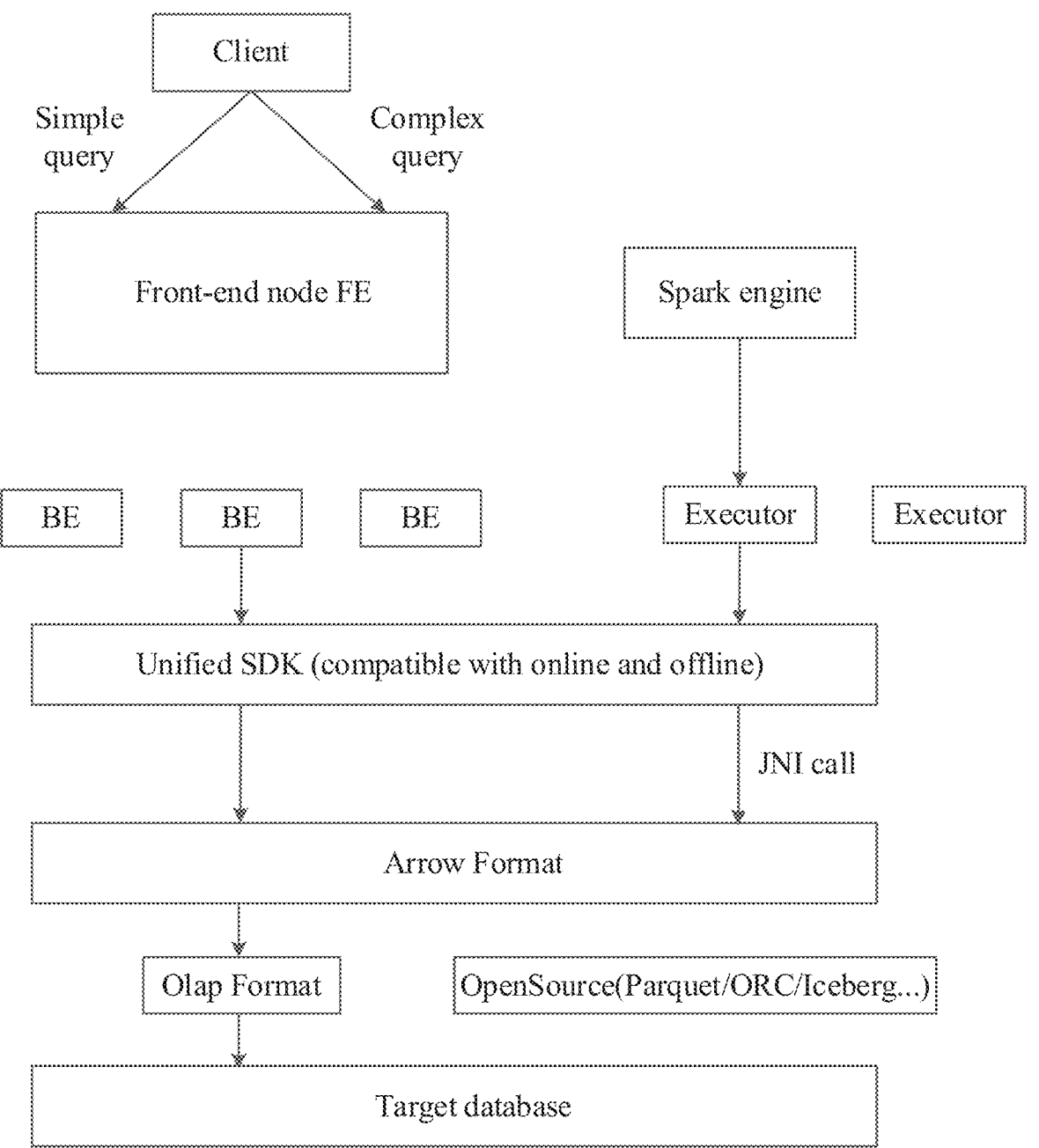
FIG. 3 is a schematic diagram of a processing manner of a data processing method according to the present disclosure.

Embodiments of the present disclosure are described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are only for exemplary purposes, and are not intended to limit the scope of protection of the present disclosure.

It should be understood that the various steps described in the method implementations of the present disclosure may be performed in different orders, and/or performed in parallel. In addition, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are for illustrative purposes only, and are not intended to limit the scope of these messages or information.

FIG. 1 shows a process 100 of an embodiment of a data processing method according to the present disclosure. The data processing method includes the following steps:

Step 101: Receive a data query request for a first data processing engine.

In this embodiment, an execution subject of the data processing method may receive a data query request for a first data processing engine. The data query request is, for example, a structured query language (Structured Query Language, SQL) statement. SQL is a database language that has a plurality of functions such as data manipulation and data definition. This language has an interactive feature, and can provide great convenience for users. A database management system should fully use the SQL language to improve the work quality and efficiency of a computer application system.

A data lakehouse is a new open architecture that integrates a data warehouse and a data lake, and combines high performance and management capabilities of the data warehouse with flexibility of the data lake. The underlying layer supports coexistence of a plurality of data types, and can implement mutual sharing between data. An upper layer can access the data lakehouse through a uniformly encapsulated interface, and can support both real-time query and analysis, thereby bringing more convenience to data governance of an enterprise.

The first data processing engine includes a front-end node (FrontEnd, FE) and a back-end node (BackEnd, BE). For example, the front-end node may be configured to receive the data query request. In addition, the front-end node may also be configured to manage metadata, manage client connections, perform query parsing and planning, generate a query execution plan, perform query scheduling (send the query to the BE for execution), and the like. The back-end node may be configured to execute a query execution plan, manage replicas, and the like. That is, the first data processing engine may be a data warehouse in a data lakehouse.

Step 102: Determine, in the front-end node, a target data processing engine based on the data query request.

In this embodiment, the execution subject may determine, in a front-end node of the first data processing engine, the target data processing engine based on the data query request. The first data processing engine performs real-time processing on data, that is, the first data processing engine is a real-time data processing engine. A second data processing engine performs offline processing on data, that is, the second data processing engine is an offline data processing engine. For example, the second data processing engine may be a data lake in a data lakehouse.

For example, the first data processing engine may have a data analysis capability of a TB (terabyte) data order of magnitude, and the second data processing engine may have a data analysis capability of a PB data order of magnitude or higher. 1 PB=1024 TB.

The front-end node may analyze the data query request, and determine whether a calculation logic of the data query request is a simple logic or a complex logic. When it is determined that the calculation logic is the simple logic, the first data processing engine may be selected as the target data processing engine to perform real-time processing on the data. When it is determined that the calculation logic is the complex logic, the second data processing engine may be selected as the target data processing engine to perform offline processing on the data.

In this embodiment, computer programming languages used by the first data processing engine and the second data processing engine are different. A computer programming language used by the first data processing engine may be a first language, and a computer programming language used by the second data processing engine may be a second language.

Step 103: When the target data processing engine is the second data processing engine, perform data query on data stored in a target database by using a preset software development kit and calling a language conversion interface based on an offline query request in the second data processing engine.

In this embodiment, when the target data processing engine is the second data processing engine, the execution subject may perform data query on data stored in a target database by using a preset software development kit and calling a language conversion interface based on an offline query request in the second data processing engine.

For example, the software development kit (SDK) may be configured to query data. The software development kit includes a set of related documents, examples, and tools that assist in developing a specific type of software, and is a toolkit for implementing data query. The software development kit may implement data query on a target database by receiving a real-time query request sent by a back-end node of the first data processing engine or receiving an offline query request sent by an Executor execution process of the second data processing engine.

The language conversion interface is configured to receive a query instruction in a second language (a computer programming language used by the second data processing engine) and call a query instruction in a first language (a computer programming language used by the first data processing engine). In other words, the language conversion interface can solve a compatibility and interoperation problem between data processing engines in the two languages.

For example, the offline query request may be generated based on the data query request. The offline query request includes a tag indicating that the query request is an offline query. For example, the front-end node of the first data processing engine may parse the data query request, and send a parsing result to the second data processing engine, so that the second data processing engine generates the offline query request by using the parsing result. For another example, the front-end node of the first data processing engine may directly send the data query request to the second data processing engine. The second data processing engine may parse the data query request, and generate the offline query request by using a parsing result. The parsing result may include a storage location, in the target database, of data queried by the data query request.

For example, the target database may be a Hadoop distributed file system (Hadoop Distributed File System, HDFS), an object storage service (Object Storage Service, OSS), a simple storage service (Simple Storage Service, S3), or the like. The target database may also be a database in the back-end node of the first data processing engine.

The method provided in the above embodiment of the present disclosure receives the data query request for the first data processing engine; then, in a front-end node of the first data processing engine, the target data processing engine is determined based on the data query request, that is, whether the target data processing engine is the first data processing engine or the second data processing engine is determined, and computer programming languages used by the first data processing engine and the second data processing engine are different; and when the target data processing engine is the second data processing engine, data query is performed on data stored in the target database by using a preset software development kit and calling the language conversion interface based on the offline query request in the second data processing engine, and the language conversion interface is configured to receive the query instruction in the second language and call the query instruction in the first language. In this way, when two data processing engines using different computer programming languages perform data processing, a compatibility problem of a data query process in a same system in different languages can be solved by using the language conversion interface, so that the second data processing engine can perform a data read and write process, thereby relieving read and write pressure of the first data processing engine in a large data volume situation.

In some optional implementations, the execution subject may perform data query on data stored in the target database by using the preset software development kit and calling the language conversion interface in the following manner: The execution subject may first use the preset software development kit and call the language conversion interface to convert a query instruction in a second language into a query instruction in a first language; and then call an arrow format (Arrow Format) interface to perform data query on data stored in the target database. The arrow format interface is configured to convert data between a row storage format and an arrow format. Arrow Format includes a language-independent in-memory data structure specification, metadata serialization, and a protocol for serialization and universal data transfer.

Because a first data processing engine (for example, an OLAP system) may store data in a columnar storage format, and a second data processing engine may store data in a row storage format, but data in the columnar storage format cannot be directly converted into data in the row storage format, in this case, the arrow format is used as a compatible format, and data in the columnar storage format can be converted to and from data in the arrow format, and data in the row storage format can also be converted to and from data in the arrow format. In this way, interaction between data in the columnar storage format and data in the row storage format can be implemented. As a compatible format when processing is performed in different systems (engines), the arrow format is in-memory, and therefore, the performance overhead is relatively small.

In some optional implementations, the front-end node may manage metadata of the second data processing engine, and the metadata may be metadata of a data table that can be read from and written into by the second data processing engine. Metadata of a data table refers to data about table data, ranging from table definitions and field attributes to table relationships and permissions. Additional metadata includes data analysis and statistical information, such as an index and a partition. A storage location of the data table can be obtained by using the metadata of the data table, and permissions of the data table can also be obtained, that is, which accounts have a permission to view data in the data table, and which accounts do not have the permission to view the data in the data table.

The front-end node may further divide a data pulling task of the second data processing engine, and send a division result to the second data processing engine, so that an Executor execution process of the second data processing engine pulls data in the target database. Here, the data in the target database may be stored according to a data shard (Tablet), and the metadata includes metadata of the data shard, for example, an index and a location of the data shard. The front-end node of the first data processing engine may generate at least one data pulling task according to the data shard. Here, one data pulling task may pull data corresponding to at least one data shard. For example, one data pulling task may pull data corresponding to three data shards. Then, the Executor execution process of the second data processing engine may execute the at least one data pulling task to pull data from the target database, so as to perform data query on the pulled data.

In this way, operations such as metadata management and task division of the second data processing engine etc. can be performed in the front-end node of the first data processing engine, without relying on a back-end node of the first data processing engine.

In some optional implementations, the query instruction may include at least one of the following: a write (Writer) instruction, a read (Reader) instruction, and a file merge (Compact) instruction. When there are too many small files, a first data processing engine needs to perform a Compact operation, this part of content can be extracted and separately executed in a second data processing engine, and the second data processing engine can release a resource after each query ends. In this way, a Writer method, a Reader method, and a Compact method in the first data processing engine (for example, an OLAP system) can be abstracted and stripped, and the methods are provided, so that a read instruction, a write instruction, and a file merge instruction in a second language are used to correspondingly call a read instruction, a write instruction, and a file merge instruction in a first language, thereby the original query instruction in the first language can be called by using the query instruction in the second language, without rewriting the query instruction for the second language, thereby saving resources. In addition, the second data processing engine can undertake more data processing tasks, further reducing the processing pressure of the first data processing engine.

In some optional implementations, the execution subject may determine the target data processing engine based on the data query request in the following manner: In the front-end node, a predicted value of a time consumption for processing the data query request may be determined. The front-end node may determine whether the predicted value of the time consumption is greater than a preset time consumption threshold. The front-end node may compare the predicted value of the time consumption with the preset time consumption threshold. When it is determined that the predicted value of the time consumption is greater than the preset time consumption threshold, the front-end node may select the second data processing engine as the target data processing engine. When it is determined that the predicted value of the time consumption is less than or equal to the preset time consumption threshold, the front-end node may select the first data processing engine as the target data processing engine. In this way, a corresponding data processing engine can be selected more reasonably for data processing.

In some optional implementations, the execution subject may determine the target data processing engine based on the data query request in the following manner: In the front-end node, a predicted value of resource consumption in a process of processing the data query request may be determined. The resource may include at least one of the following: a CPU, a memory, a network, or I/O etc., The front-end node may determine whether the predicted value of the resource consumption is greater than a preset resource consumption threshold. The front-end node may compare the predicted value of the resource consumption with the preset resource consumption threshold. When it is determined that the predicted value of the resource consumption is greater than the preset resource consumption threshold, the front-end node may select the second data processing engine as the target data processing engine. When it is determined that the predicted value of the resource consumption is less than or equal to the preset resource consumption threshold, the front-end node may select the first data processing engine as the target data processing engine. In this way, a corresponding data processing engine can be selected more reasonably for data processing.

In some optional implementations, a target interface (for example, the above language conversion interface) may be a Java native interface (Java Native Interface, JNI), the first language may be a C/C++ language, and the second language may be a Java language. The JNI is a powerful feature in the Java platform. An application may integrate C/C++ code into a Java program by using the JNI. Through the JNI, developers can take advantage of powerful functions of the Java platform without having to give up investment in original code; because the JNI is a specification interface defined by the Java platform, when a programmer integrates a local library into a Java code set, as long as a language interoperability problem is solved on one platform, the solution can be relatively easily ported to another Java platform. When the Java platform is deployed to a local system, it is necessary to allow a Java program to work with local code. Partly because of legacy code (to protect original investment) problems (some efficiency-sensitive code is implemented in C, but execution efficiency of the current Java VM is completely reliable), engineers have long started to build Java applications based on C/C++, so C/C++ code will coexist with Java applications for a long time. The JNI can still be used to write programs in another language while taking advantage of the powerful Java platform. The JNI is a set of bidirectional interfaces that allow interoperability between Java and local code.

In some optional implementations, the first data engine includes an on-line analytical processing engine, and OLAP is a computer processing technology for analyzing and querying a large-scale data set. OLAP technology is mainly used for multi-dimensional data analysis and data mining. By providing a multi-dimensional data model and a multi-dimensional query function, users are helped to perform analysis and query on data from different perspectives and at different levels, with an emphasis on analysis and decision-making.

For example, the first database may include but is not limited to: StarRocks, Doris, and ClickHouse etc., StarRocks is a ultrafast full-scenario MPP database. The StarRocks can make data analysis simpler and more agile for users. Users can use StarRocks to support ultrafast analysis of a variety of data analysis scenarios without complicated preprocessing. The StarRocks architecture is concise, uses a fully vectorized engine, and is equipped with a CBO (Cost Based Optimizer) optimizer, so that the query speed (especially for multi-table join query) is faster. The StarRocks can well support real-time data analysis and can implement efficient query of real-time updated data. The StarRocks also supports modern materialized views to further accelerate query. By using The StarRocks, users can flexibly construct various models including large wide tables, star models, and snowflake models. The StarRocks is compatible with a MySQL (open-source relational database management system) protocol, supports standard SQL syntax, is easy to connect to and use, has no external dependencies in the entire system, is highly available, and is easy to maintain and manage.

The Doris is also an MPP architecture database product dedicated to OLAP query. The Doris can not only meet a variety of data analysis requirements, such as fixed historical reporting, real-time data analysis, interactive data analysis, and exploratory data analysis; but also has a very prominent cluster expansion capability, and can support an ultra-large data set of 10 PB or more. In addition, the Doris provides very powerful support for real-time data, and therefore is a very powerful database.

The ClickHouse is a columnar storage database based on an MPP architecture, and can generate a data analysis result in real time by using an SQL query statement. The full name of the ClickHouse is Click Stream, Data WareHouse. The ClickHouse is also an open-source database that implements a vectorized query engine, and is also able to realize OLAP query. The ClickHouse can directly compresses the time consumption of OLAP query to the sub-second level.

The second data processing engine may include: a distributed computing framework. For example, the second data processing engine may be Spark. The Spark is an open-source distributed computing framework for large-scale data analysis and processing. In-memory computing technology and a directed acyclic graph (Directed Acyclic Graph, DAG) are used to provide faster analysis and processing capabilities than a MapReduce engine. The Spark has an offline analysis capability of a PB level or higher.

Because an OLAP engine uses an MPP architecture and is suitable for a real-time data warehouse scenario, when a data volume reaches a PB data order of magnitude, data processing cannot be performed by using the OLAP engine, because of insufficient memory and a long running time, and when an executed task fails, there is no retry mechanism. In this case, such a problem can be solved by using the Spark. Therefore, combining the OLAP engine with the Spark can meet: real-time performance (real-time data analysis capability of data of a TB data order of magnitude) and a large data volume (offline analysis capability of a PB data order of magnitude or higher).

With reference to FIG. 2, a process 200 of another embodiment of a data processing method is shown. The process 200 of the data processing method includes the following steps:

Step 201: Receive a data query request for a first data processing engine.

Step 202: Determine, in a front-end node, a target data processing engine based on the data query request.

Step 203: When the target data processing engine is the second data processing engine, perform data query on data stored in a target database by using a preset software development kit and calling a language conversion interface based on an offline query request in the second data processing engine.

In this embodiment, steps 201 to 203 may be performed in a similar manner to steps 101 to 103, and details are not described again here.

Step 204: When the target data processing engine is the first data processing engine, perform data query on data stored in the target database by using the software development kit based on a real-time query request in a back-end node.

In this embodiment, when the target data processing engine is the first data processing engine, the execution subject may perform data query on data stored in the target database by using the software development kit based on a real-time query request in a back-end node of the first data processing engine.

The real-time query request is generated based on the data query request, and the real-time query request includes a tag indicating that the query request is a real-time query. The front-end node of the first data processing engine may parse the data query request to obtain a parsing result, and then may send the parsing result to the back-end node. The back-end node may generate the real-time query request by using the parsing result, and then may send the real-time query request to the software development kit, thereby implementing data query by using the software development kit.

It can be seen from FIG. 2 that compared with the embodiment corresponding to FIG. 1, the process 200 of the data processing method in this embodiment reflects the step of performing data query on data stored in the target database by using the software development kit based on the real-time query request in the back-end node of the first data processing engine when the target data processing engine is the first data processing engine. Therefore, the solution described in this embodiment can implement real-time and offline integrated data read and write by using a unified SDK.

In some optional implementations, the execution subject may perform data query on the data stored in the target database by using the software development kit in the following manner: The execution subject may perform data query on the data stored in the target database by using the software development kit and calling an arrow format interface. The arrow format interface may be configured to convert data between a columnar storage format and an arrow format. Arrow Format includes a language-independent in-memory data structure specification, metadata serialization, and a protocol for serialization and universal data transfer.

Because a first data processing engine may store data in a columnar storage format, and a second data processing engine may store data in a row storage format, but data in the columnar storage format cannot be directly converted into data in the row storage format, in this case, the arrow format is used as a compatible format, and data in the columnar storage format can be converted to and from data in the arrow format, and data in the row storage format can also be converted to and from data in the arrow format. In this way, interaction between data in the columnar storage format and data in the row storage format can be implemented. As a compatible format when processing is performed in different systems (engines), the arrow format is in-memory, and therefore, the performance overhead is relatively small.

With reference to FIG. 3, FIG. 3 is a schematic diagram of a processing manner of a data processing method according to this embodiment. In FIG. 3, a client sends an SQL statement to an OLAP engine. The OLAP engine includes an FE node and a BE node. The FE node parses the received SQL statement, and determines whether a query logic of the SQL statement is a simple query or a complex query. When it is determined that the query logic is the simple query, the BE node of the OLAP engine sends a real-time query request to the unified SDK, and the unified SDK performs data query on data requested by the real-time query request in a target database. The unified SDK is compatible with real-time data query and offline data query.

When it is determined that the query logic is the complex query, the FE node of the OLAP engine sends a parsing result to a Spark engine, and an Executor execution process of the Spark engine sends an offline query request to the unified SDK. The unified SDK performs data query on data requested by the offline query request in the target database. Specifically, in a process of performing data query by using the unified SDK, a JNI interface is called, and the JNI interface receives a query instruction in a Java language and calls a query instruction in C/C++ code, thereby solving a compatibility problem of a data query process in a same system in different languages.

In addition, because the OLAP engine may store data in a columnar storage format, and the Spark engine may store data in a row storage format, but data in the columnar storage format cannot be directly converted into data in the row storage format, in this case, the arrow format is used as a compatible format, and data in the columnar storage format can be converted to and from data in the arrow format, and data in the row storage format can also be converted to and from data in the arrow format. In this way, interaction between data in the columnar storage format and data in the row storage format can be implemented, that is, data interaction between the OLAP engine and the Spark engine is implemented.

The target database in FIG. 3 may be any one of HDFS, OSS, TOS, and S3.

One set of data storage, one set of unified SDK, and two optional engines are implemented by using the processing manner in FIG. 3. A data format preferably uses a data format of the OLAP engine, because the data format of the OLAP engine has specific optimizations, such as an index, a dictionary, and other means to improve performance. However, in order to be compatible with other open-source formats to enter the system, the unified SDK has two capabilities: one is to be able to adapt to an interface switch between an offline task for a large batch of queries and a real-time task for high-frequency update write queries; and the other is to be able to be compatible with original open-source formats from different open-source formats for continuous reading and writing.

Figure 4:
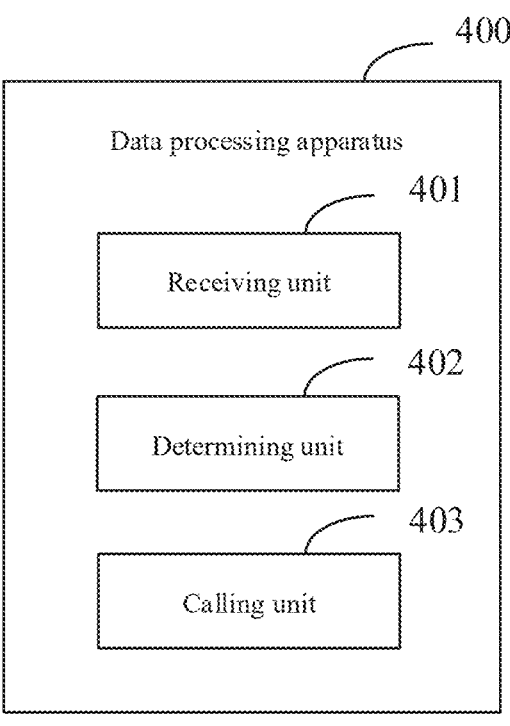
FIG. 4 is a schematic diagram of a structure of an embodiment of a data processing apparatus according to the present disclosure.

With further reference to FIG. 4, as an implementation of the methods shown in the foregoing figures, this application provides an embodiment of a data processing apparatus. This apparatus embodiment corresponds to the method embodiment shown in FIG. 1, and the apparatus may be specifically applied to various electronic devices.

As shown in FIG. 4, the data processing apparatus 400 in this embodiment includes: a receiving unit 401, a determining unit 402, and a calling unit 403. The receiving unit 401 is configured to receive a data query request for a first data processing engine, where the first data processing engine includes a front-end node and a back-end node, and the front-end node receives the data query request; the determining unit 402 is configured to determine, in the front-end node, a target data processing engine based on the data query request, where the target data processing engine is the first data processing engine or a second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and the calling unit 403 is configured to perform, when the target data processing engine is the second data processing engine, data query on data stored in a target database by using a preset software development kit and calling a language conversion interface based on an offline query request in the second data processing engine, where the software development kit is configured to query data, the language conversion interface is configured to receive a query instruction in the second language and call a query instruction in the first language, and the offline query request is generated based on the data query request.

In this embodiment, specific processing of the receiving unit 401, the determining unit 402, and the calling unit 403 of the data processing apparatus 400 may refer to step 101, step 102, and step 103 in the corresponding embodiment in FIG. 1.

In some optional implementations, the data processing apparatus 400 may further include: a query unit (not shown in the figure). The query unit may be configured to perform, when the target data processing engine is the first data processing engine, data query on data stored in the target database by using the software development kit based on a real-time query request in a back-end node of the first data processing engine, where the real-time query request is generated based on the data query request.

In some optional implementations, the query unit is further configured to perform data query on the data stored in the target database by using the software development kit in the following manner: perform data query on the data stored in the target database by using the software development kit and calling an arrow format interface, where the arrow format interface is configured to convert data between a columnar storage format and an arrow format.

In some optional implementations, the calling unit 403 is further configured to perform data query on data stored in the target database by using the preset software development kit and calling the language conversion interface in the following manner: use the preset software development kit and call the language conversion interface to convert a query instruction in a second language into a query instruction in a first language; and call an arrow format interface to perform data query on data stored in the target database, where the arrow format interface is configured to convert data between a row storage format and an arrow format.

In some optional implementations, at least one of the following operations is performed in the front-end node: manage metadata of the second data processing engine, where the metadata is metadata of a data table that can be read from and written into by the second data processing engine; and divide a data pulling task of the second data processing engine.

In some optional implementations, the query instruction includes at least one of the following: a read instruction, a write instruction, and a file merge instruction.

In some optional implementations, the determining unit 402 is further configured to determine the target data processing engine based on the data query request in the following manner: determine a predicted value of a time consumption for processing the data query request; and select the second data processing engine as the target data processing engine in response to the predicted value of the time consumption being greater than a preset time consumption threshold.

In some optional implementations, the determining unit 402 is further configured to determine the target data processing engine based on the data query request in the following manner: determine a predicted value of resource consumption in a process of processing the data query request; and select the second data processing engine as the target data processing engine in response to the predicted value of the resource consumption being greater than a preset resource consumption threshold.

In some optional implementations, the language conversion interface is a Java native interface, the first language is a C/C++ language, and the second language is a Java language.

In some optional implementations, the first data engine includes an on-line analytical processing engine, and the second data engine includes a distributed computing framework.

Figure 5:
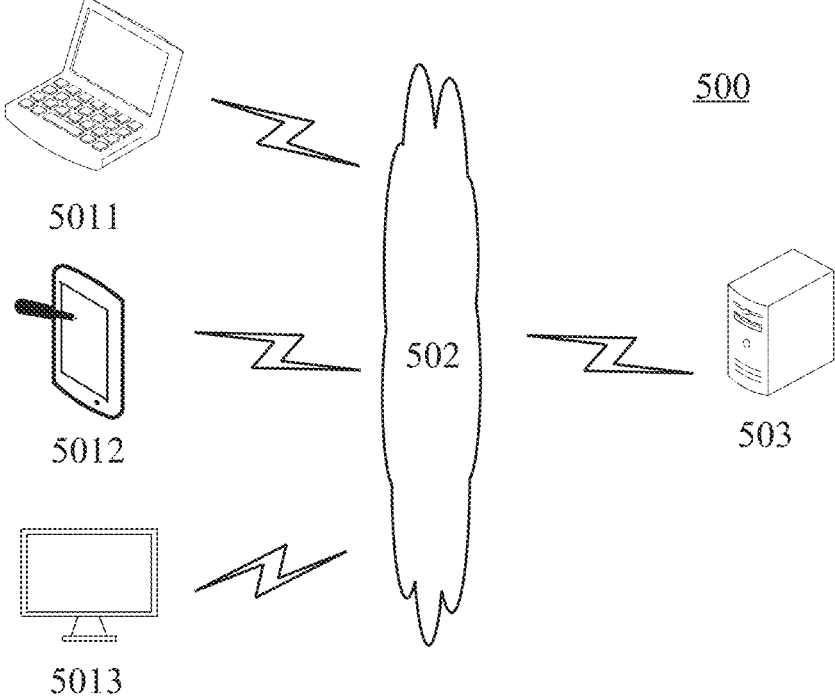
FIG. 5 is a diagram of an exemplary system architecture to which various embodiments of the present disclosure may be applied.

FIG. 5 shows an exemplary system architecture 500 to which an embodiment of a data processing method of the present disclosure may be applied.

As shown in FIG. 5, the system architecture 500 may include terminal devices 5011, 5012, and 5013, a network 502, and a server 503. The network 502 is a medium used to provide a communication link between the terminal devices 5011, 5012, and 5013 and the server 503. The network 502 may include various connection types, such as a wired or wireless communication link, an optical fiber cable, and the like.

Users may use the terminal devices 5011, 5012, and 5013 to interact with the server 503 through the network 502 to send or receive messages, and the like. For example, the server 503 may receive a data query request for a first data processing engine sent by the terminal devices 5011, 5012, and 5013. The terminal devices 5011, 5012, and 5013 may be installed with various communication client applications, such as a short video application and a search engine.

The terminal devices 5011, 5012, and 5013 may be hardware or software. When the terminal devices 5011, 5012, and 5013 are hardware, they may be various electronic devices with a display screen and supporting information interaction, including but not limited to a smart phone, a tablet computer, a laptop portable computer, and the like. When the terminal devices 5011, 5012, and 5013 are software, they may be installed in the foregoing listed electronic devices. They may be implemented as a plurality of software or software modules (for example, a plurality of software or software modules used to provide distributed services), or may be implemented as a single software or software module. This is not specifically limited herein.

The server 503 may be a server that provides various services. For example, it may be a background server that processes data query requests. The server 503 may receive a data query request for a first data processing engine, where the first data processing engine includes a front-end node and a back-end node, and the front-end node receives the data query request; then may determine, in the front-end node, a target data processing engine based on the data query request, where the target data processing engine is the first data processing engine or a second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and when the target data processing engine is the second data processing engine, perform data query on data stored in a target database by using a preset software development kit and calling a language conversion interface based on an offline query request in the second data processing engine, where the software development kit is configured to query data, the language conversion interface is configured to receive a query instruction in the second language and call a query instruction in the first language, and the offline query request is generated based on the data query request.

It should be noted that the server 503 may be hardware or software. When the server 503 is hardware, it may be implemented as a distributed server cluster composed of a plurality of servers, or may be implemented as a single server. When the server 503 is software, it may be implemented as a plurality of software or software modules (for example, used to provide distributed services), or may be implemented as a single software or software module. This is not specifically limited herein.

It should be further noted that the data processing method provided in this embodiment of the present disclosure may be performed by the server 503, and the data processing apparatus may be provided in the server 503.

It should be understood that the numbers of terminal devices, networks, and servers in FIG. 5 are merely illustrative. According to implementation requirements, there may be any number of terminal devices, networks, and servers.

Figure 6:
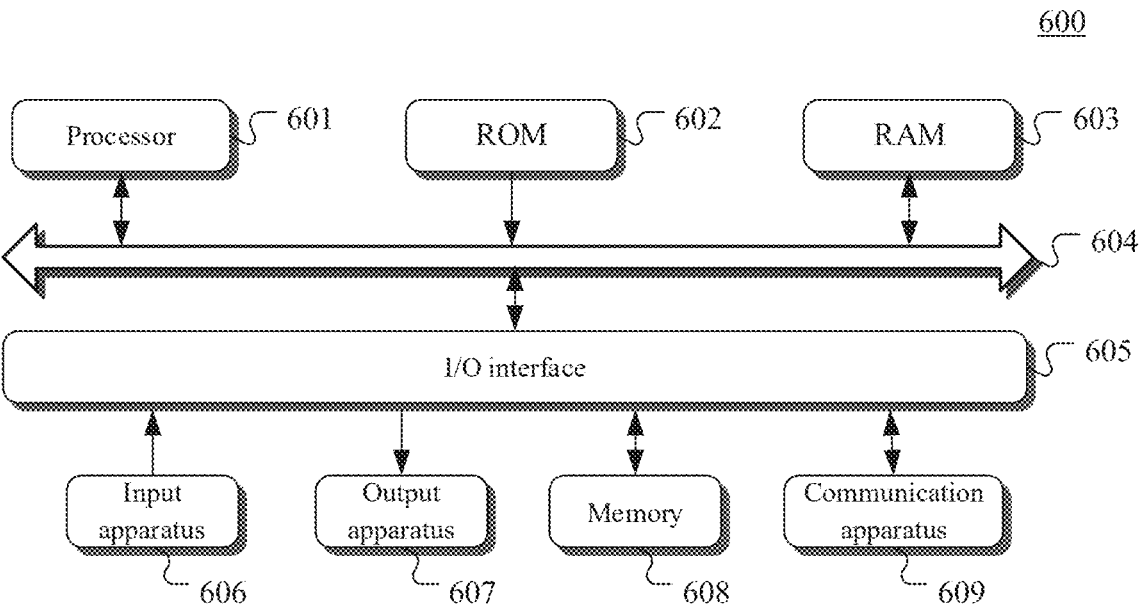
FIG. 6 is a schematic diagram of a structure of a computer system of an electronic device suitable for implementing embodiments of the present disclosure.

Reference is made to FIG. 6 below, which is a schematic diagram of a structure of an electronic device (for example, the server in FIG. 5) 600 suitable for implementing the embodiments of the present disclosure. The electronic device shown in FIG. 6 is merely an example, and shall not impose any limitation on the function and scope of use of the embodiments of the present disclosure.

As shown in FIG. 6, the electronic device 600 may include a processor (for example, a central processor, a graphics processor, etc.) 601 that may perform a variety of appropriate actions and processing in accordance with a program stored in a read-only memory (ROM) 602 or a program loaded from a memory 608 into a random access memory (RAM) 603. The RAM 603 further stores various programs and data required for the operation of the electronic device 600. The processor 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, and a gyroscope; an output apparatus 607 including, for example, a liquid crystal display (LCD), a speaker, and a vibrator; the memory 608 including, for example, a tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all of the shown apparatuses. It may be an alternative to implement or have more or fewer apparatuses. Each block shown in FIG. 6 may represent one apparatus, or may represent a plurality of apparatuses as required.

In particular, according to an embodiment of the present disclosure, the process described above with reference to the flowcharts may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 609 and installed, installed from the memory 608, or installed from the ROM 602. When the computer program is executed by the processor 601, the above functions defined in the method of the embodiment of the present disclosure are performed. It should be noted that the computer-readable medium described in the embodiment of the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this embodiment of the present disclosure, the computer-readable storage medium may be any tangible medium containing or storing a program that may be used by or in combination with an instruction execution system, apparatus, or device. In this embodiment of the present disclosure, the computer-readable signal medium may include a data signal propagated in a baseband or as a part of a carrier, and the data signal carries computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

The foregoing computer-readable medium may be contained in the foregoing electronic device. Alternatively, the computer-readable medium may exist independently, without being assembled into the electronic device. The computer-readable medium carries one or more programs that, when executed by the electronic device, cause the electronic device to: receive a data query request for a first data processing engine, where the first data processing engine includes a front-end node and a back-end node, and the front-end node receives the data query request; determine, in the front-end node, a target data processing engine based on the data query request, where the target data processing engine is the first data processing engine or a second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and when the target data processing engine is the second data processing engine, perform data query on data stored in a target database by using a preset software development kit and calling a language conversion interface based on an offline query request in the second data processing engine, where the software development kit is configured to query data, the language conversion interface is configured to receive a query instruction in the second language and call a query instruction in the first language, and the offline query request is generated based on the data query request.

The computer program code for performing operations in the embodiments of the present disclosure may be written in one or more programming languages or a combination thereof, where the programming languages include an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving a remote computer, the remote computer may be connected to a computer of a user through any type of network, including a local area network (LAN) or a wide area network (WAN), or may be connected to an external computer (for example, connected over the Internet using an Internet service provider).

The flowcharts and block diagrams in the accompanying drawings illustrate the possible system architectures, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be executed substantially in parallel, or they can sometimes be executed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The units involved in the embodiments described in the present disclosure may be implemented by means of software, or may be implemented by means of hardware. The described units may also be provided in a processor, for example, it may be described as: a processor includes a receiving unit, a determining unit, and a calling unit. The names of these units do not constitute a limitation on the unit itself in some cases. For example, the receiving unit may also be described as "a unit that receives a data query request for a first data processing engine".

The above descriptions are merely preferred embodiments of the present disclosure and explanations of the applied technical principles. Those skilled in the art should understand that the scope of the invention involved in the embodiments of the present disclosure is not limited to the technical solutions formed by a specific combination of the foregoing technical features, and should also cover other technical solutions formed by any combination of the foregoing technical features or equivalent features thereof without departing from the foregoing inventive concept. For example, a technical solution formed by replacing the above features with technical features with similar functions disclosed in the embodiments of the present disclosure (but not limited thereto).

The invention claimed is:

1. A data processing method for two data processing engines using different computer programming languages, comprising:

storing both data in a columnar storage format of a first data processing engine and data in a row storage format of a second data processing engine into a database;

receiving a data query request for the first data processing engine, wherein the first data processing engine comprises a front-end node and a back-end node, and the front-end node receives the data query request and manages client connections;

determining, in the front-end node, a third data processing engine based on the data query request, wherein the third data processing engine is the first data processing engine or the second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and performing, when the third data processing engine is the second data processing engine, data query on data stored in the database by using a software development kit and calling a language conversion interface based on an offline query request in the second data processing engine, wherein the software development kit is configured to query data, convert the data in a columnar storage format to first Arrow Format data, and convert the data in a row storage format to and from second Arrow Format data, the language conversion interface is configured to receive a query instruction in the second language and call a query instruction in the first language, and the offline query request is generated based on the data query request.

2. The method according to claim 1, wherein after the determining the third data processing engine based on the data query request, the method further comprises:

performing, when the third data processing engine is the first data processing engine, data query on data stored in the database by using the software development kit based on a real-time query request in the back-end node, wherein the real-time query request is generated based on the data query request.

3. The method according to claim 2, wherein the performing data query on data stored in the database by using the software development kit comprises:

performing data query on data stored in the database by using the software development kit and calling an arrow format interface, wherein the arrow format interface is configured to convert data between a columnar storage format and an arrow format.

4. The method according to claim 1, wherein the performing data query on data stored in the database by using the software development kit and calling the language conversion interface comprises:

performing, by using the software development kit and calling the language conversion interface, conversion from the query instruction in the second language to the query instruction in the first language; and performing data query on data stored in the database by calling an arrow format interface, wherein the arrow format interface is configured to convert data between a row storage format and an arrow format.

5. The method according to claim 1, wherein at least one of following operations is performed in the front-end node:

managing metadata of the second data processing engine, wherein the metadata is metadata of a data table that can be read from and written into by the second data processing engine; and dividing a data pulling task of the second data processing engine.

6. The method according to claim 1, wherein the query instruction comprises at least one of following: a read instruction, a write instruction, and a file merge instruction.

7. The method according to claim 1, wherein the determining the third data processing engine based on the data query request comprises:

determining a predicted value of a time consumption for processing the data query request; and selecting the second data processing engine as the third data processing engine in response to the predicted value of the time consumption being greater than a time consumption threshold.

8. The method according to claim 1, wherein the determining the third data processing engine based on the data query request comprises:

determining a predicted value of resource consumption in a process of processing the data query request; and selecting the second data processing engine as the third data processing engine in response to the predicted value of the resource consumption being greater than a resource consumption threshold.

9. The method according to claim 1, wherein the language conversion interface is a Java native interface, the first language is a C/C++ language, and the second language is a Java language.

10. The method according to claim 1, wherein the first data engine comprises an on-line analytical processing engine, and the second data engine comprises a distributed computing framework.

11. A non-transient computer-readable medium, having a computer program stored thereon, wherein the computer program, when executed by a processor, cause the processor to implement a data processing method for two data processing engines using different computer programming languages, and the method comprises:

storing both data in a columnar storage format of a first data processing engine and data in a row storage format of a second data processing engine into a database;

receiving a data query request for the first data processing engine, wherein the first data processing engine comprises a front-end node and a back-end node, and the front-end node receives the data query request and manages client connections;

determining, in the front-end node, a third data processing engine based on the data query request, wherein the third data processing engine is the first data processing engine or the second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and performing, when the third data processing engine is the second data processing engine, data query on data stored in the database by using a software development kit and calling a language conversion interface based on an offline query request in the second data processing engine, wherein the software development kit is configured to query data, convert the data in a columnar storage format to first Arrow Format data, and convert the data in a row storage format to and from second Arrow Format data, the language conversion interface is configured to receive a query instruction in the second language and call a query instruction in the first language, and the offline query request is generated based on the data query request.

12. An electronic device, comprising:

at least one processor; and a memory having at least one program stored thereon, wherein the at least one program, when executed by the at least one processor, causes the at least one processor to implement a data processing method for two data processing engines using different computer programming languages, and the method comprises:

storing both data in a columnar storage format of a first data processing engine and data in a row storage format of a second data processing engine into a database;

receiving a data query request for the first data processing engine, wherein the first data processing engine comprises a front-end node and a back-end node, and the front-end node receives the data query request and manages client connections;

determining, in the front-end node, a third data processing engine based on the data query request, wherein the third data processing engine is the first data processing engine or the second data processing engine, the first data processing engine performs real-time processing on data, the second data processing engine performs offline processing on data, computer programming languages used by the first data processing engine and the second data processing engine are different, the first data processing engine uses a first language, and the second data processing engine uses a second language; and performing, when the third data processing engine is the second data processing engine, data query on data stored in the database by using a software development kit and calling a language conversion interface based on an offline query request in the second data processing engine, wherein the software development kit is configured to query data, convert the data in a columnar storage format to first Arrow Format data, and convert the data in a row storage format to and from second Arrow Format data, the language conversion interface is configured to receive a query instruction in the second language and call a query instruction in the first language, and the offline query request is generated based on the data query request.

13. The electronic device according to claim 12, wherein after the determining the third data processing engine based on the data query request, the method further comprises:

performing, when the third data processing engine is the first data processing engine, data query on data stored in the database by using the software development kit based on a real-time query request in the back-end node, wherein the real-time query request is generated based on the data query request.

14. The electronic device according to claim 13, wherein the performing data query on data stored in the database by using the software development kit comprises:

performing data query on data stored in the database by using the software development kit and calling an arrow format interface, wherein the arrow format interface is configured to convert data between a columnar storage format and an arrow format.

15. The electronic device according to claim 12, wherein the performing data query on data stored in the database by using the software development kit and calling the language conversion interface comprises:

performing, by using the software development kit and calling the language conversion interface, conversion from a query instruction in the second language to a query instruction in the first language; and performing data query on data stored in the database by calling an arrow format interface, wherein the arrow format interface is configured to convert data between a row storage format and an arrow format.

16. The electronic device according to claim 12, wherein at least one of following operations is performed in the front-end node:

managing metadata of the second data processing engine, wherein the metadata is metadata of a data table that can be read from and written into by the second data processing engine; and dividing a data pulling task of the second data processing engine.

17. The electronic device according to claim 12, wherein the query instruction comprises at least one of following: a read instruction, a write instruction, and a file merge instruction.

18. The electronic device according to claim 12, wherein the determining the third data processing engine based on the data query request comprises:

determining a predicted value of a time consumption for processing the data query request; and selecting the second data processing engine as the third data processing engine in response to the predicted value of the time consumption being greater than a time consumption threshold.

19. The electronic device according to claim 12, wherein the determining the third data processing engine based on the data query request comprises:

determining a predicted value of resource consumption in a process of processing the data query request; and selecting the second data processing engine as the third data processing engine in response to the predicted value of the resource consumption being greater than a resource consumption threshold.

20. The electronic device according to claim 12, wherein the language conversion interface is a Java native interface, the first language is a C/C++ language, and the second language is a Java language.

* * * * *